UNITED STATES PATENT OFFICE.

WILLIAM E. KIRST, OF MIDLAND, MICHIGAN, ASSIGNOR TO THE DOW CHEMICAL COMPANY, OF MIDLAND, MICHIGAN, A CORPORATION OF MICHIGAN.

MANUFACTURE OF CHLORHYDRIN.

1,386,118.  Specification of Letters Patent.  Patented Aug. 2, 1921.

No Drawing.   Application filed December 9, 1918.   Serial No. 265,859.

*To all whom it may concern:*

Be it known that I, WILLIAM E. KIRST, a citizen of the United States, and a resident of Midland, county of Midland, and State of Michigan, have invented a new and useful Improvement in the Manufacture of Chlorhydrin, of which the following is a specification, the principle of the invention being herein explained and the best mode in which I have contemplated applying that principle, so as to distinguish it from other inventions.

Ethylene chlorhydrin, or glycol chlorhydrin ($CH_2Cl.CH_2OH$) as it is preferably termed, is freely soluble in water, and one of the difficulties encountered in its manufacture on a commercial scale has been to eliminate the water necessarily present or resulting from the reactions by which the compound is formed. Whether because of the closeness of the boiling point of the chlorhydrin to that of water, or other reason, such chlorhydrin seems extremely tenacious of the water, and the familiar method of fractional distillation has been found entirely inadequate in commercial practice. The present method, however, is based on the discovery that by adding a medium that is soluble in chlorhydrin but insoluble in water, the mixture of such medium and water will boil off at a temperature at which the combined vapor tensions of such liquids is equal to or greater than atmospheric, or other superimposed pressure, and this temperature will be sufficiently below the boiling point of the chlorhydrin to enable a complete separation of the water, as well as of the admixed compound to be effected.

To the accomplishment of the foregoing and related ends, said invention, then, consists of the steps hereinafter fully described and particularly pointed out in the claims, the following description setting forth in detail one approved method of carrying out the invention, such disclosed mode, however, constituting but one of the various ways in which the principle of the invention may be used.

As a substance suitable for the purpose in hand, I preferably employ benzol which is insoluble in water, but readily soluble in chlorhydrin. The combined vapor tensions of the water and benzol will be greater than atmospheric pressure at a temperature considerably below the boiling point of the chlorhydrin, as well as considerably below the boiling point of water alone. As a result the mixture of water and benzol will boil off, upon the application of a proper temperature, and if a sufficient amount of benzol has been added the water may be removed to the very last trace, leaving the chlorhydrin perfectly dry. Any excess of benzol remaining over will then readily distil off by itself.

The mingled vapors of water and benzol, driven off from the solution-mixture, will be received in a suitable condenser, and the resulting liquid mixture collected and held in a chamber where the water will separate out, leaving the benzol to be used over again, as will be readily understood.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. The method of removing water from a solution of the same and glycol chlorhydrin, which consists in adding benzol; and then raising the resulting solution-mixture to a temperature at which the combined vapor tensions of the benzol and water are equal to or greater than atmospheric or other superimposed pressure, thereby simultaneously evaporating the water and benzol and leaving the chlorhydrin behind.

2. The method of removing water from a solution of the same and glycol chlorhydrin, which consists in adding benzol, raising the resulting solution-mixture to a temperature at which the combined vapor tensions of the benzol and water are equal to or greater than atmospheric or other superimposed pressure, thereby simultaneously evaporating the water and benzol and leaving the chlorhydrin behind; condensing the mingled vapors of benzol and water thus driven off; and separating the condensed benzol from the water and using over again in the first step.

3. The method of removing water from a solution of the same and glycol halogen-hydrin, which consists in adding benzol and then raising the resulting solution-mixture to a temperature at which the combined vapor tensions of the benzol and water are equal to or greater than atmospheric or other superimposed pressure, thereby simultaneously evaporating the water and benzol and leaving the halogen-hydrin behind.

Signed by me, this 4th day of December, 1918.

WILLIAM E. KIRST.